US006705655B2

(12) United States Patent
Yang

(10) Patent No.: US 6,705,655 B2
(45) Date of Patent: Mar. 16, 2004

(54) DOUBLE-STACK TOOL RACK

(75) Inventor: Qinghao Yang, New Providence (BS)

(73) Assignee: Global Industries Holdings Ltd., Nassau (BS)

( * ) Notice: Subject to any disclaimer, the term of this patent is extended or adjusted under 35 U.S.C. 154(b) by 0 days.

(21) Appl. No.: 10/158,644

(22) Filed: May 31, 2002

(65) Prior Publication Data

US 2003/0222472 A1 Dec. 4, 2003

(51) Int. Cl.[7] ............................ A45F 5/00; A01K 97/06

(52) U.S. Cl. ............................ 294/161; 294/2; 294/143; 43/54.1; 206/821; 220/4.27; 211/131.1; 211/168; 312/201

(58) Field of Search ............................ 294/2, 143, 161; 206/821, 315.11; 220/4.27, 23.86, 23.87, 23.88, 23.89, 503–507, 23.4, 23.6; 211/131.1, 144, 70.6, 168; 43/54.1, 57.1; 312/326, 201, 120, 123, 125, 135, 136, 285

(56) References Cited

U.S. PATENT DOCUMENTS

| | | | | | |
|---|---|---|---|---|---|
| 1,889,829 | A | * | 12/1932 | Govier et al. | 211/131.1 |
| 2,775,498 | A | * | 12/1956 | Gettel | 312/201 |
| 3,498,471 | A | * | 3/1970 | Dirkx | 211/131.1 |
| 3,889,817 | A | * | 6/1975 | Berkman | 211/131.1 |
| 4,239,308 | A | * | 12/1980 | Bradley | 312/201 |
| 4,700,850 | A | * | 10/1987 | Morgan et al. | 211/131.1 |
| 4,999,943 | A | * | 3/1991 | Crabtree | 43/54.1 |
| 5,651,596 | A | * | 7/1997 | Carlson et al. | 312/334.46 |
| 5,669,494 | A | * | 9/1997 | Geffen | 206/309 |
| 5,799,787 | A | * | 9/1998 | Talbot | 206/315.11 |
| 5,813,528 | A | * | 9/1998 | Bliek et al. | 206/315.11 |

* cited by examiner

*Primary Examiner*—Eileen D. Lillis
*Assistant Examiner*—Paul T Chin
(74) *Attorney, Agent, or Firm*—Charles E. Baxley

(57) ABSTRACT

A double-stack tool rack is constructed to include a base having an upright pivot shaft, a plurality of tool boxes respectively pivoted to the upright shaft and arranged into two stacks, and a carrying handle coupled to the upright pivot shaft of the base at the top.

22 Claims, 7 Drawing Sheets

DOUBLE-STACK TOOL RACK

BACKGROUND OF THE INVENTION

1. Field of the Invention

The present invention relates to a tool rack and, more particularly, to double-stack tool rack, which comprises an upright pivot shaft, and a plurality of tool boxes respectively pivoted to the upright pivot shaft and arranged in two stacks.

2. Description of the Related Art

Various different designs of tool racks and boxes have been disclosed for use to hold tools and accessories, and have appeared on the market. It illustrates a clip according to the prior art. In order to provide more compartments for holding more tools and or accessories, the dimension of the tool rack or box should be relatively increased. However, it is inconvenient to carry a bulky or heavy tool rack from place to place.

SUMMARY OF THE INVENTION

The present invention has been accomplished under the circumstances in view. It is one object of the present invention to provide a double-stack tool rack, which requires less installation space. It is another object of the present invention to provide a double-stack tool rack, which can easily be carried from place to place by hand, or positively hung nails on the wall. It is still another object of the present invention to provide a double-stack tool rack, which enables the user to arrange storage items in good order. To achieve these and other objects of the present invention, the double-stack tool rack comprises a base, the base comprising an upright pivot shaft perpendicularly extended from the center of a top side thereof; a first tool box set and a second tool box set respectively pivoted to the upright pivot shaft of the base, the first and second tool box sets each comprising a plurality of tool boxes disposed at different elevations, the tool boxes each having at least one coupling ring respectively sleeved onto the upright pivot shaft of the base; a tool box positioning structure provided in the coupling rings of the tool boxes and the upright pivot shaft of the base for enabling the tool boxes to be horizontally turned about the upright pivot shaft and positioned in one of a series of angles; and a handle coupled to a top end of the upright pivot shaft.

DETAILED DESCRIPTION OF THE PREFERRED EMBODIMENT

Figure 1:
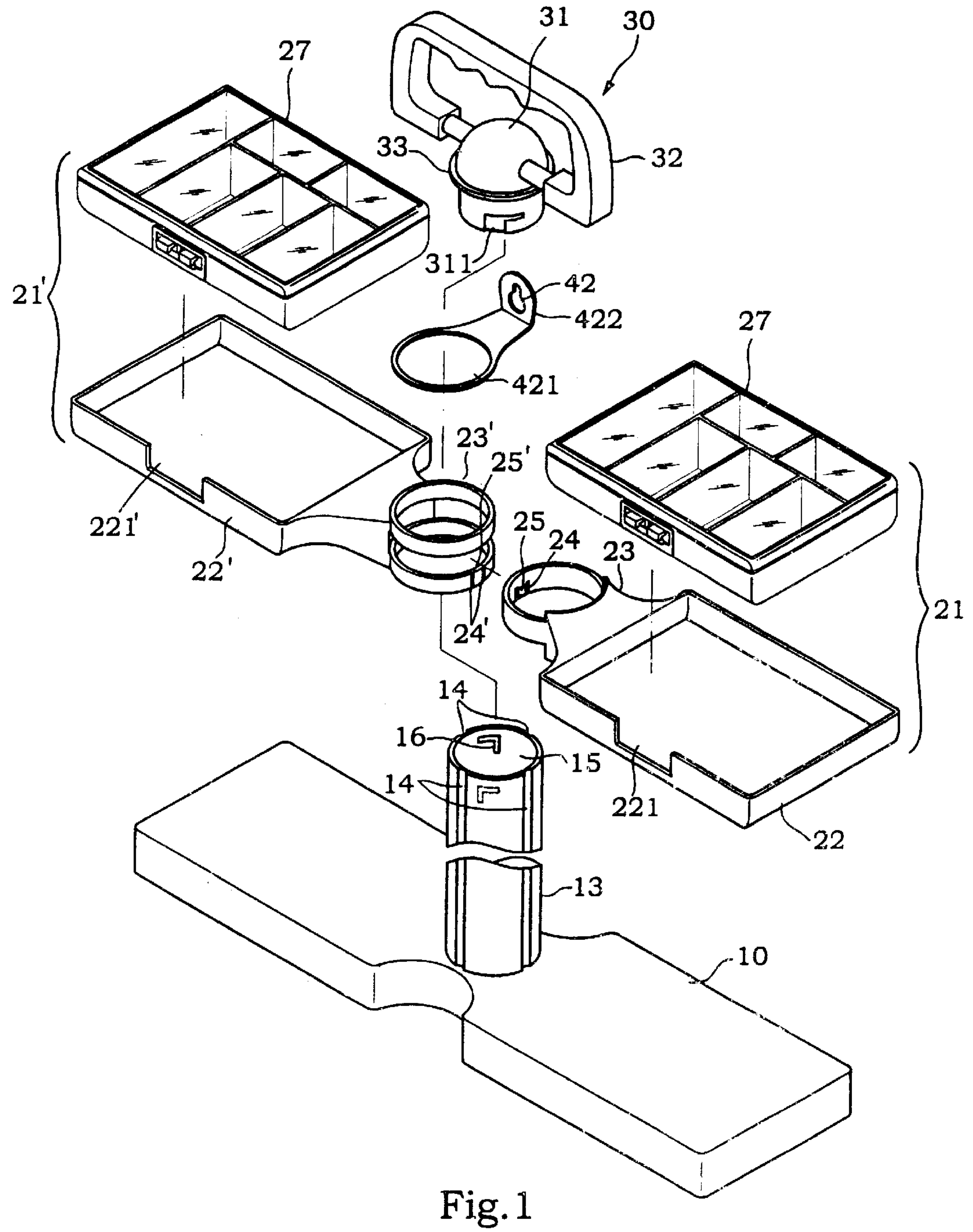
FIG. 1 is an exploded view of a double-stack tool rack according to the present invention.
Figure 2:
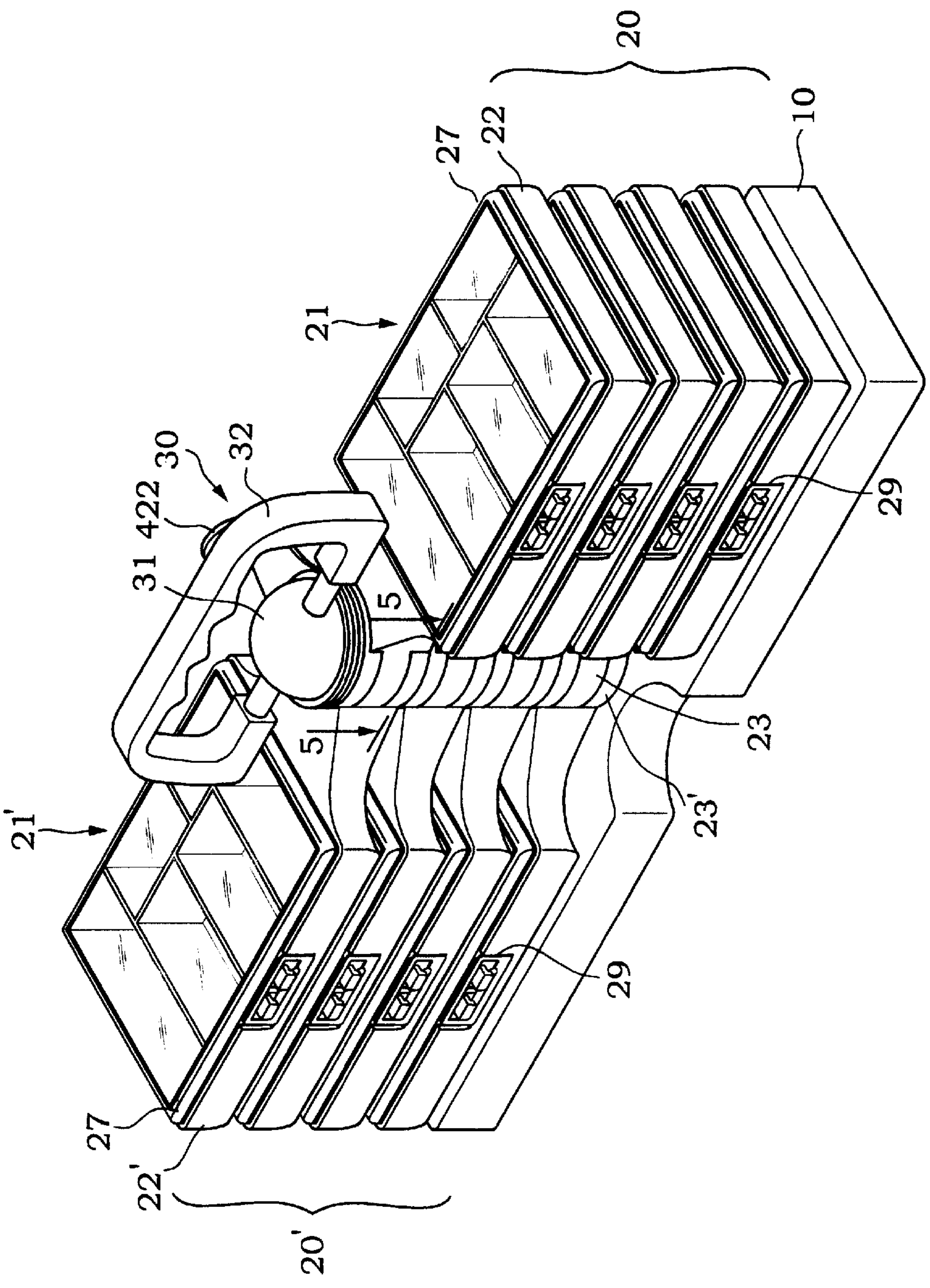
FIG. 2 is an oblique front elevation of the double-stack tool rack according to the present invention.

Referring to FIGS. 1 and 2, a double-stack tool rack is shown comprising a base 10, a tool box positioning structure, a handle 30, a handle fastening structure, and a hanging structure.

Figure 6:
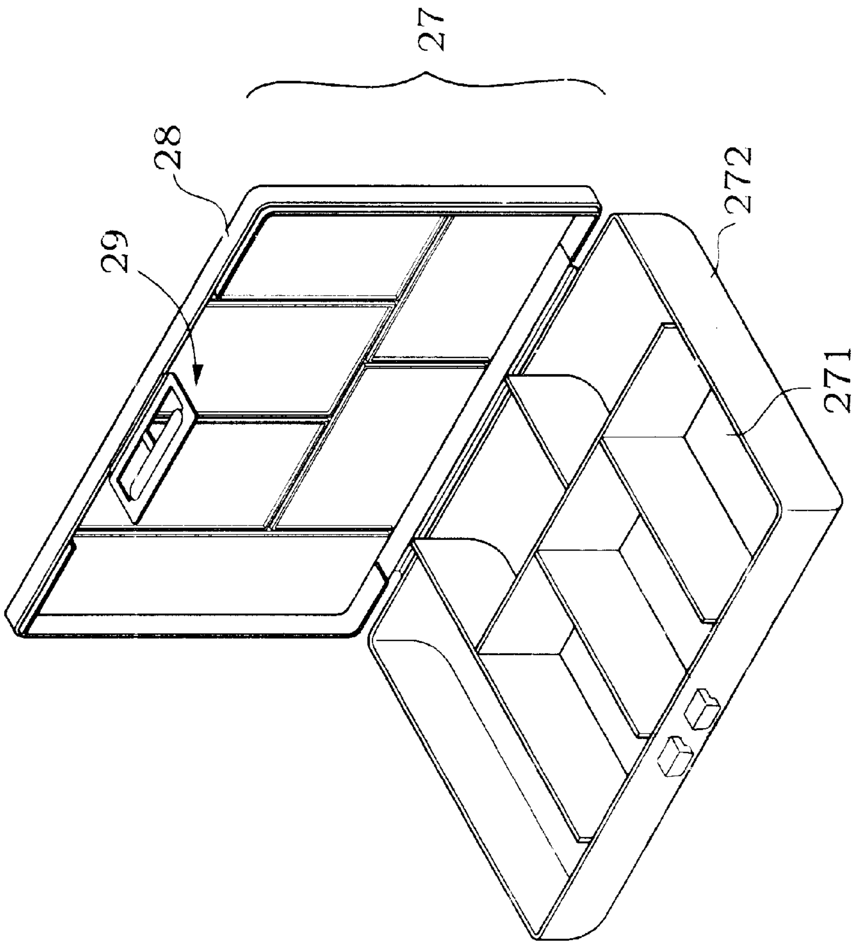
FIG. 6 is a perspective view of a box body for a tool box according to the present invention.

The base 10 has an upright pivot shaft 13 at the center. The upright pivot shaft 13 has a top open section 15. A first tool box set 20 and a second tool box set 20' are respectively pivoted to the upright pivot shaft 13, each box set 20 or 20' including a number of tool boxes 21 or 21'. Each tool box 21 or 21' comprises a carrier frame 22 or 22', and a box body 27 carried in the carrier frame 22 or 22'. The carrier frame 22' of each tool box 21' of the second tool box set 20' comprises two coupling rings 23' horizontally outwardly protruded from one end thereof at different elevations and sleeved onto the upright pivot shaft 13 of the base 10. The carrier frame 22 of each tool box 21 of the first tool box set 20 comprises a coupling ring 23 horizontally outwardly protruded from one end thereof and sleeved onto the upright pivot shaft 13 of the base 10. When the carrier frames 22 of the tool boxes 21;21' are coupled to the upright shaft 13 of the base 10, the coupling ring 23 of the carrier frame 22 of one tool box 21 of the first tool box set 20 is supported between the coupling rings 23' of the carrier frame 22' of one tool box 21' of the second tool box set 20'. The box body 27, as shown in FIG. 6, comprises a bottom shell 272 defining a plurality of compartments 271 for holding tools and/or accessories, a top cover 28 hinged to one side of the bottom shell 272 and adapted for closing the compartments 271, and a snap fastener 29 adapted for locking the box body 27 when the top cover 28 closed on the bottom shell 272. Further, each carrier frame 22 has a side opening 221 or 221' corresponding to the snap fastener 29, for enabling the user to access to the snap fastener 29 conveniently.

Figure 5:
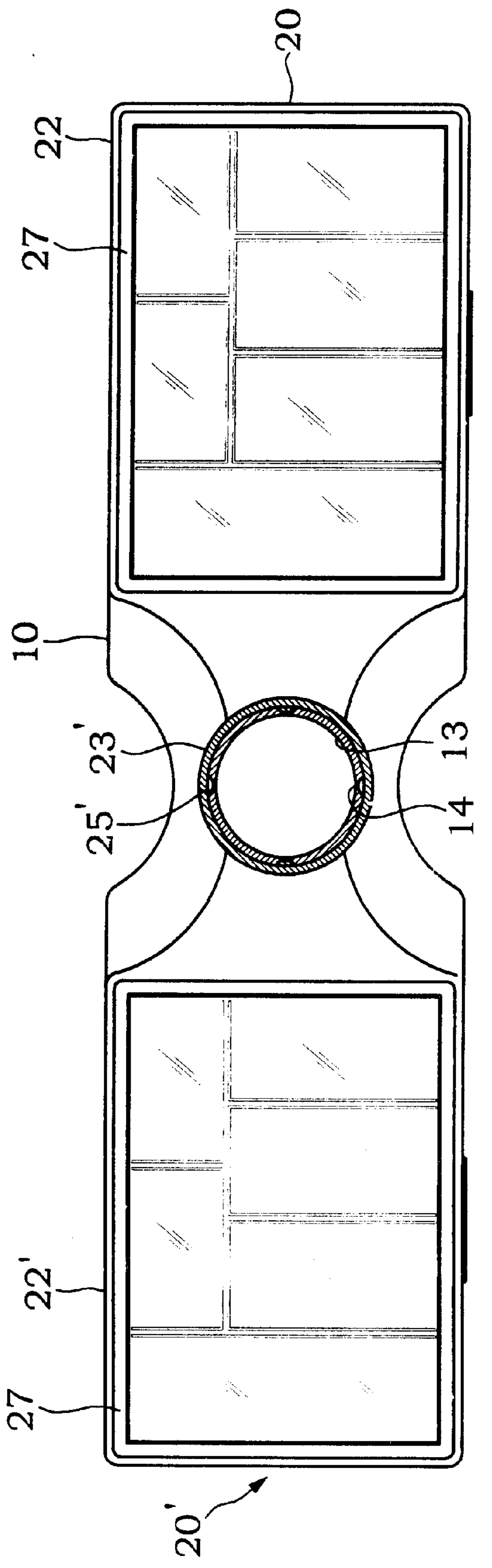
FIG. 5 is a sectional view taken along line 5—5 of FIG. 2.

The aforesaid tool box positioning structure is provided for controlling the positioning of the tool boxes 21;21'. The tool box positioning structure, as shown in FIGS. 1 and 5, comprises a plurality of longitudinal grooves 14 equiangularly spaced around the periphery of the upright pivot shaft 13, and a plurality of spring strips 24;24' respectively formed integral with the coupling rings 23;23' of the carrier frames 22;22' of the tool boxes 21;21' (the spring strips 24 are formed by cutting two axially extended cuts in each coupling ring of the carrier frames 22;22' of the tool boxes 21;21'). The spring strips 24 or 24' each have a projection 25 or 25' adapted for engaging one longitudinal groove 14 of the upright pivot shaft 13 of the base 10. After installation of the tool boxes 21;21', the projections 25;25' are respectively engaged into the longitudinal grooves 14 of the upright shaft 13 of the base 10, preventing the tool boxes 21;21' from rotary motion relative to the upright pivot shaft 13 of the base 10. However, when the user turns one tool box 21 or 21' about the upright pivot shaft 13 of the base 10 with the hand, the projection 25;25' is moved with the respective spring strip 24 or 24' sideways from the corresponding longitudinal groove 14 of the upright pivot shaft 13 of the base 10, enabling the respective tool box 21 or 21' to be turned about the upright pivot shaft 13 of the base 10 to the desired direction.

The aforesaid handle 30, as shown in FIGS. 1 and 2, comprises a mounting block 31 press-fitted into the top open section 15 of the upright pivot shaft 13 of the base 10, a stop flange 33 extended around the periphery of the mounting block 31 and stopped at the topmost edge of the upright pivot shaft 13 of the base 10, and a handgrip 32 pivoted to the mounting block 31.

The aforesaid handle fastening structure, as shown in FIG. 1, comprises at least one, for example, two angled retaining slots 311 symmetrically formed in the periphery of the mounting block 31 of the handle 30 below the top flange 33, and two angled retaining ribs 16 protruded from the inside wall of the top open section 15 of the upright pivot shaft 13 of the base 10 and adapted for engaging into the angled retaining slots 311 of the mounting block 31 of the handle 30. When inserting the mounting block 31 of the handle 30 into the top open section 15 of the upright pivot shaft 13, the angled retaining slots 311 are respectively aimed at the angled retaining ribs 16. After the mounting block 31 of the mounting block 31 of the handle 30 press-fitted into the top open section 15 of the upright pivot shaft 13, the handle 30 is rotated through an angle to force the angled retaining ribs 16 into engagement with the angled retaining slots 311, stopping axial movement of the mounting block 31 of the handle 30 relative to the upright pivot shaft 13 of the base 10.

Figure 3:
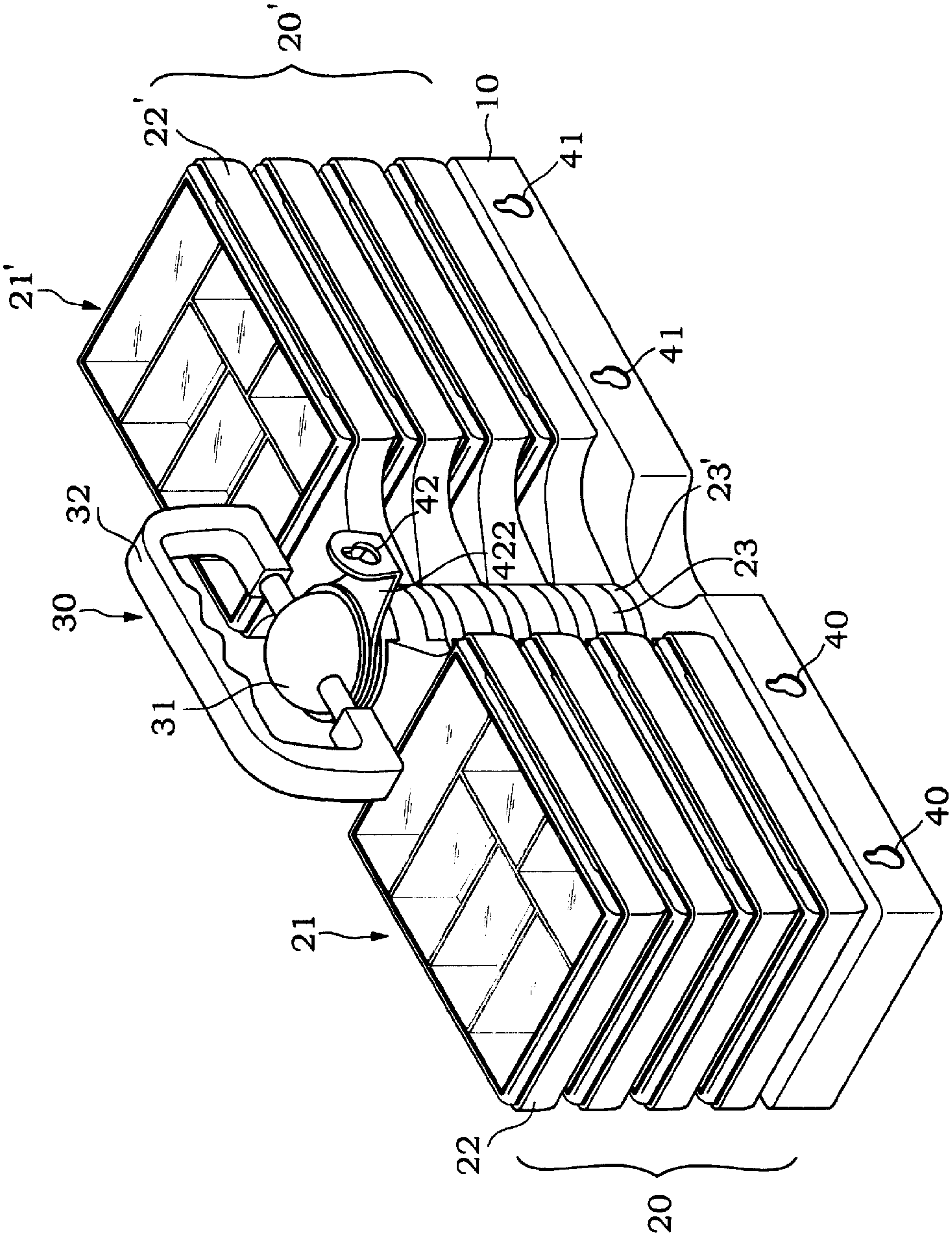
FIG. 3 is an oblique rear elevation of the double-stack tool rack according to the present invention.
Figure 4:
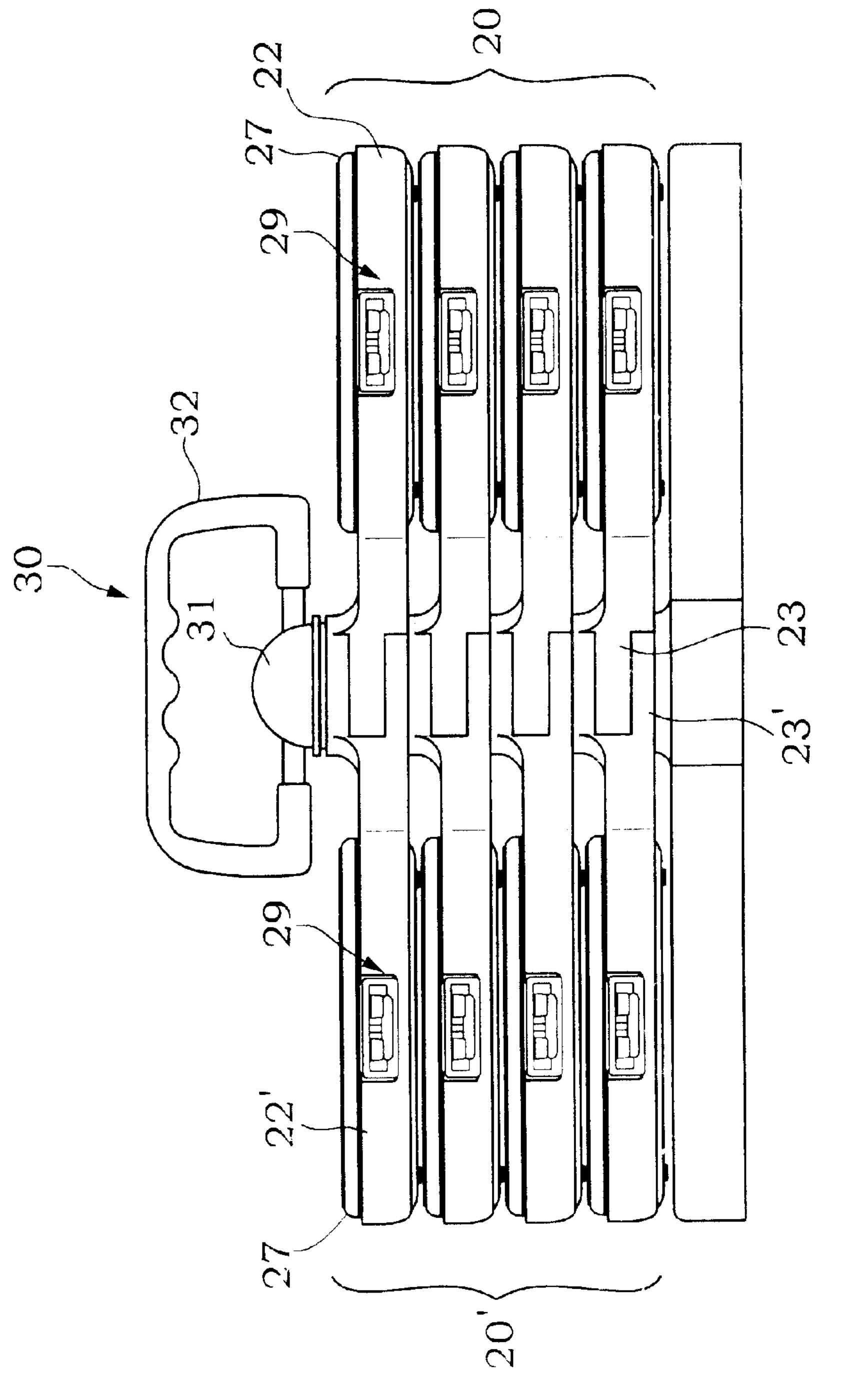
FIG. 4 is a front view of the double-stack tool rack according to the present invention.

The aforesaid hanging structure, as shown in FIGS. 1 and 3, comprises a plurality of keyway-like hanging holes 40;41;42. The hanging holes 40;41 are respectively provided in the back sidewall of the base 10, and spaced from one another at a pitch in a line. The hanging hole 42 is formed in the angled rear end 422 of a hanging plate 421, which is coupled to the upright pivot shaft 13 and stopped between the stop flange 33 of the mounting block 31 of the handle 30 and the topmost edge of the upright pivot shaft 13 of the base 10. By means of the hanging holes 40;41;42, the double-stack tool rack can be positively hung on nails in the wall of the working place.

Figure 7:
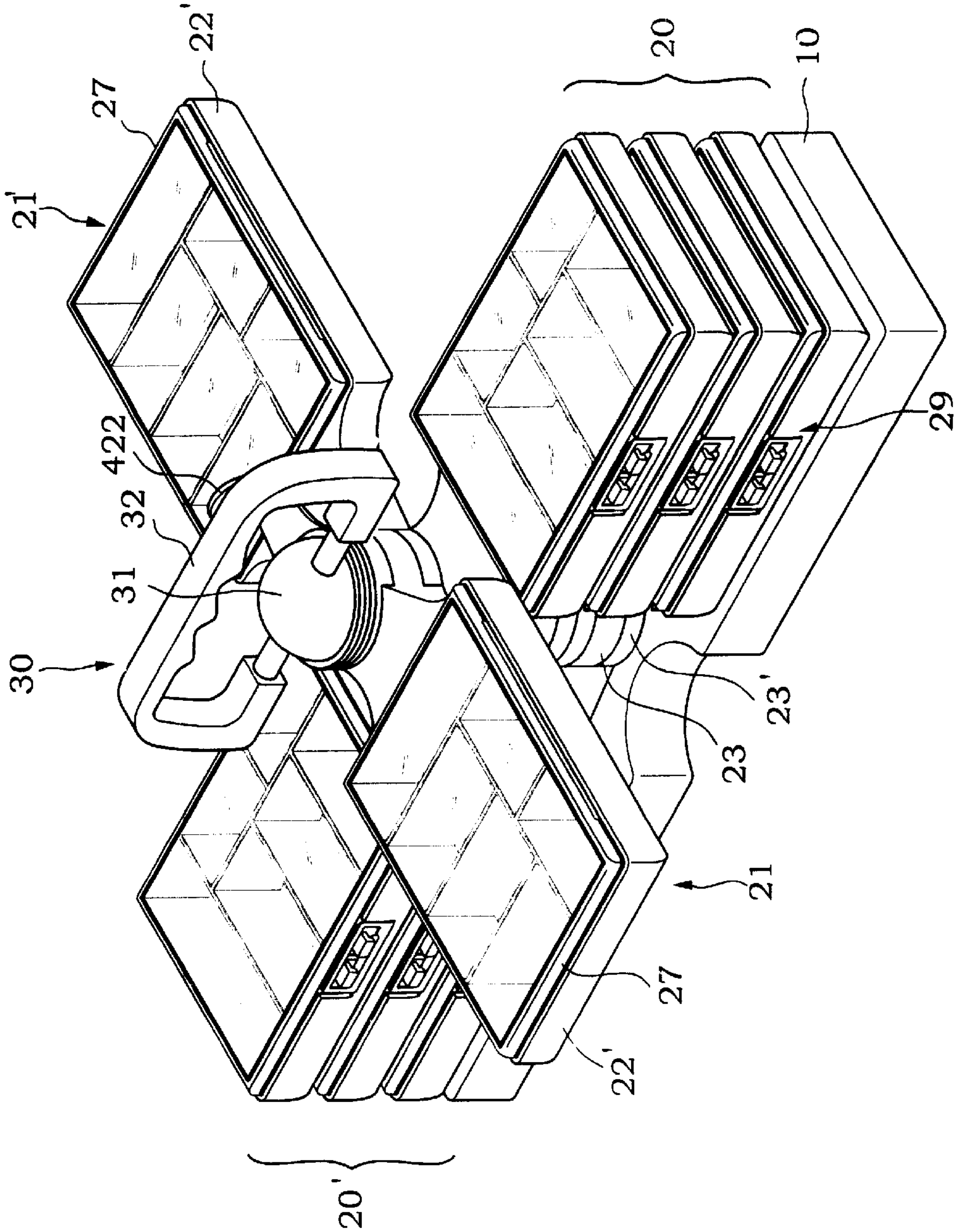
FIG. 7 is an applied view of the double-stack tool rack according to the present invention.

Referring to FIGS. 2, 3, and 7, through the handle 30, the double-stack tool rack can conveniently be carried from place to place by hand. Further, the user can turn every selected tool box 21 or 21' horizontally about the upright pivot shaft 13 to the desired angle convenient for picking up storage items from the compartment 271 of the respective box body 27.

As indicated above, the double-stack tool rack of the present invention achieves the following advantages:

a) Because the tool boxes 21;21' are arranged in two stacks, the tool rack requires less installation space.

b) The tool boxes 21;21' can horizontally be turned about the upright pivot shaft 13 and quickly positively positioned in the desired angular position convenient for enabling the user to pick up storage items.

c) The box bodies 27 of the tool boxes 21;21' can be made transparent and marked with things convenient for classification of storage items.

d) The box bodies 27 and the carrier frames 22;22' of the tool boxes 21;21' are detachable so that the user can carry the box bodies 27 away from the carrier frames 22;22' for arranging storage items.

e) The double-stack tool box can conveniently positively hung on nails in the wall.

What the invention claimed is:

1. A double-stack tool rack comprising:

a base, said base comprising an upright pivot shaft perpendicularly extended from the center of a top side thereof;

a first generally rectangular tool box set and a second generally rectangular tool box set respectively pivoted to said upright pivot shaft of said base, said first and second tool box sets each comprising a plurality of tool boxes disposed at different elevations, said tool boxes each having at least one coupling ring respectively sleeved onto said upright pivot shaft of said base;

a tool box positioning structure provided in the coupling rings of said tool boxes and the upright pivot shaft of said base for enabling said tool boxes and the upright pivot shaft of said base for enabling said tool boxes to be horizontally turned about said upright pivot shaft and positioned in one of a series of angles; and a handle coupled to a top end of said upright pivot shaft.

2. The double-stack tool rack as claimed in claim 1, wherein said tool boxes each comprise a carrier frame and a box body carried in said carrier frame; said coupling rings of said tool boxes are respectively extended from the carrier frames of said tool boxes at one end.

3. The double-stack tool rack as claimed in claim 2, wherein the box body of each of said tool boxes is comprised of a bottom shell defining a plurality of compartments for keeping storage items, and a top cover hinged to one side of said bottom shell and adapted for closing said compartments.

4. The double-stack tool rack as claimed in claim 1, wherein the tool boxes of said first tool box set each have one coupling ring respectively sleeved onto said upright pivot shaft of said base.

5. The double-stack tool rack as claimed in claim 4, wherein the tool boxes of said second tool box set each have two coupling rings disposed at different elevations and sleeved onto said upright pivot shaft of said base.

6. The double-stack tool rack as claimed in claim 1, wherein said upright pivot shaft of said base comprises a top open section coupled to said handle.

7. The double-stack tool rack as claimed in claim 6, wherein said handle comprises a mounting block fastened to the top open section of said upright pivot shaft of said base.

8. The double-stack tool rack as claimed in claim 7, wherein said handle further comprises a handgrip pivoted to said mounting block.

9. A double-stack tool rack comprising:

a base, said base comprising an upright pivot shaft perpendicularly extended from the center of a top side thereof;

a first tool box set and a second tool box set respectively pivoted to said upright pivot shaft of said base, said first and second tool box sets each comprising a plurality of tool boxes disposed at different elevations, said tool boxes each having at least one coupling ring respectively sleeved onto said upright pivot shaft of said base;

a tool box positioning structure provided in the coupling rings of said tool boxes and the upright pivot shaft of said base for enabling said tool boxes to be horizontally turned about said upright pivot shaft and positioned in one of a series of angles; and a handle coupled to a top end of said upright pivot shaft;

wherein said tool boxes each comprise a carrier frame and a box body carried in said carrier frame; said coupling rings of said tool boxes are respectively extended from the carrier frames of said tool boxes at one end, and wherein the box body of each of said tool boxes is comprised of a bottom shell defining a plurality of compartments for keeping storage items, and a top cover hinged to one side of said bottom shell and adapted for closing said compartments.

10. The double-stack tool rack as claimed in claim 9, wherein the box body of each of said tool boxes further comprises a snap fastener adapted for locking said top cover when said top cover closed on said bottom shell.

11. The double-stack tool rack as claimed in claim 10, wherein the carrier frame of each of said tool boxes has an opening in one side wall thereof corresponding to the snap fastener of the box body of the respective tool box.

12. A double-stack tool rack comprising:

a base, said base comprising an upright pivot shaft perpendicularly extended from the center of a top side thereof;

a first tool box set and a second tool box set respectively pivoted to said upright pivot shaft of said base, said first and second tool box sets each comprising a plurality of tool boxes disposed at different elevations, said tool boxes each having at least one coupling ring respectively sleeved onto said upright pivot shaft of said base;

a tool box positioning structure provided in the coupling rings of said tool boxes and the upright pivot shaft of said base for enabling said tool boxes to be horizontally turned about said upright pivot shaft and positioned in one of a series of angles; and a handle coupled to a top end of said upright pivot shaft wherein the tool boxes of said first tool box set each have one coupling ring respectively sleeved onto said upright pivot shaft of said base, and wherein the tool boxes of said second tool box set each have two coupling rings disposed at different elevations and sleeved onto said upright pivot shaft of said base.

13. The double-stack tool rack as claimed in claim 12, wherein the coupling ring of each tool box of said first tool box set is inserted in between the coupling rings of one tool box of said second tool box set.

14. The double-stack tool rack as claimed in claim 13, wherein said tool box positioning structure comprises a plurality of longitudinal grooves equiangularly spaced around the periphery of said upright pivot shaft of said base, and a plurality of spring strips respectively formed integral with the coupling rings of said tool boxes, said spring strips each comprising a projection adapted for engaging said longitudinal grooves.

15. A double-stack tool rack comprising:

a base, said base comprising an upright pivot shaft perpendicularly extended from the center of a top side thereof;

a first tool box set and a second tool box set respectively pivoted to said upright pivot shaft of said base, said first and second tool box sets each comprising a plurality of tool boxes disposed at different elevations, said tool boxes each having at least one coupling ring respectively sleeved onto said upright pivot shaft of said base;

a tool box positioning structure provided in the coupling rings of said tool boxes and the upright pivot shaft of said base for enabling said tool boxes to be horizontally turned about said upright pivot shaft and positioned in one of a series of angles; and a handle coupled to a top end of said upright pivot shaft;

wherein said upright pivot shaft of said base comprises a top open section coupled to said handle;

wherein said handle comprises a mounting block fastened to the top open section of said upright pivot shaft of said base; and wherein said handle further comprises a handgrip pivoted to said mounting block.

16. The double-stack tool rack as claimed in claim 15 further comprising a handle fastening structure adapted to secure said mounting block of said handle to said upright pivot shaft of said base.

17. The double-stack tool rack as claimed in claim 16, wherein said handle fastening structure comprises a plurality of angled retaining slots disposed in the periphery of said mounting block of said handle, and a plurality of angled retaining ribs respectively protruded from an inside wall of said upright pivot shaft of said base and adapted for engaging into said angled retaining slots.

18. A double-stack tool rack comprising:

a base, said base comprising an upright pivot shaft perpendicularly extended from the center of a top side thereof;

a first tool box set and a second tool box set respectively pivoted to said upright pivot shaft of said base, said first and second tool box sets each comprising a plurality of tool boxes disposed at different elevations, said tool boxes each having at least one coupling ring respectively sleeved onto said upright pivot shaft of said base;

a tool box positioning structure provided in the coupling rings of said tool boxes and the upright pivot shaft of said base for enabling said tool boxes to be horizontally turned about said upright pivot shaft and positioned in one of a series of angles; and a handle coupled to a top end of said upright pivot shaft, further comprising a hanging structure for hanging.

19. The double-stack tool rack as claimed in claim 18, wherein said hanging structure comprises a plurality of hanging holes.

20. The double-stack tool rack as claimed in claim 19, wherein said hanging holes are disposed in three corners in said base.

21. The double-stack tool rack as claimed in claim 20, wherein said hanging holes include first hanging holes and second hanging holes respectively disposed in a back sidewall of said base and arranged in a line, and a third hanging hole formed in a hanging plate fastened to said base.

22. The double-stack tool rack as claimed in claim 21, wherein said hanging plate is coupled to said upright pivot shaft of said base and stopped between the topmost edge of said upright pivot shaft and a part of said handle, having an angled free end defining said third hanging hole.

* * * * *